2,990,411
POLYNITRO COMPOUNDS

Henry Feuer, Lafayette, Ind., and Gerd Leston, Scott Township, Allegheny County, Pa., assignors to Purdue Research Foundation, Lafayette, Ind., a corporation of Indiana
No Drawing. Filed Sept. 26, 1958, Ser. No. 764,732
11 Claims. (Cl. 260—349)

Our invention relates to polynitro compounds, and more particularly, it relates to polynitro compounds obtained by addition of tetranitroparaffins to compounds with activated double bonds.

Our new compounds are represented by the following structural formula:

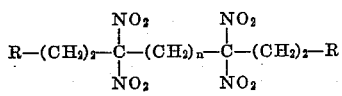

where R is selected from the group consisting of —CON$_3$,

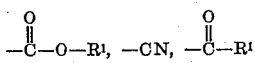

—SO$_2$CH$_3$, —NH$_2$, and —NCO; R$^1$ is selected from the group consisting of hydrogen, methyl, ethyl, propyl and butyl; and $n$ is a number from 0 to 10 inclusive.

Materials coming within the scope of our invention include 4,4,7,7-tetranitrodecanedinitrile, 4,4,8,8-tetranitroundecanedinitrile, 5,5,8,8-tetranitrododecane-2,11-dione, 4,4,7,7-tetranitrodecanedial, 4,4,9,9-tetranitrododecanedinitrile, 1,10-bis(methylsulfonyl)-3,3,8,8-tetranitrodecane, 6,6,9,9-tetranitrotetradecane-3,12-dione; 4,4,13,13-tetranitrohexadecanedinitrile; 1,13-bis(methylsulfonyl)-3,3,11,11-tetranitrotridecane, 4,4,15,15-tetranitrodecanedial, 4,4,8,8-tetranitroundecanedioylazide, 3,3,7,7-tetranitrononamethylene diisocyanate, 3,3,7,7-tetranitrononanedicarbamate, 3,3,4,4-tetranitrohexane-1,6-diamine, dimethyl 4,4,7,7-tetranitrodecanedioate, dipropyl 4,4,8,8-tetranitroundecanedioate, 4,4,7,7-tetranitrodecanedioic acid, 4,4,8,8-tetranitroundecanedioic acid and 4,4,9,9-tetranitrododecanedioic acid.

Most of our new compounds are prepared by reacting a tetranitroparaffin having the following structural formula:

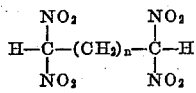

where $n$ is a number from 0 to 10 inclusive with an olefinic compound having the following structural formula:

where R is —CON$_3$, —CN,

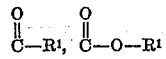

or —SO$_2$CH$_3$. Olefinic compounds which we can employ in producing our new compounds include acrylonitrile, methylvinyl ketone, 4-pentene-3-one, acrolein, methylvinyl sulfone, etc. In carrying out the reaction for production of our new compounds, we prefer to employ the corresponding glycol derivative of the tetranitroparaffin, such glycols being precursors for the tetranitroparaffins. The latter material is formed from the precursor when the reactants are contacted under basic conditions. Since basic conditions also catalyze the reaction, we produce our new compounds by reacting the olefinic compound and the tetranitroparaffin in the presence of a base and also generally in the presence of an invert solvent, such as methanol, ethanol, tetrahydrofuran, formamide, dimethylformamide, etc.

Our monomers can be utilized to form polymers useful as both solid and liquid propellants for reaction motors. These polymers can be fluids or solids, depending upon the chain length of the polymer, the nature of the cross-linking agent, etc. These polymers are also stable to shock, heat, etc., to the extent that, as a general rule, additional stabilizers are not required in the propellant mixtures. Our monomers are also plasticizers for our nitropolymers.

As previously indicated, low molecular weight polymers prepared from the monomers of our invention are fluids. These propellants are generally rich in fuel elements and as such can be utilized as a fuel in the process of U.S. Patent 2,537,526 where tetranitromethane and hexanitroethane were used as oxidants and liquid nitroparaffins were used as fuels; in the processes described in U.S. Patents 2,582,048 and 2,548,803 wherein nitrosubstituted aliphatic compounds having more than one nitro group per carbon atom were used as oxidants and nitrosubstituted compounds having less than one nitro group per carbon atom were used as fuels in monopropellant systems; or in the similar process of U.S. Patent 2,590,009.

We have found that generally our solid polymers can be dissolved in polar solvents, such as dimethylformamide and lower nitroalkanes, such as tetranitromethane, and, as such, are operative as fuels in the above-described processes. Other solvents which can be used to liquify our polymers include hydrazine, lower alkyl amines, dimethylsulfoxide, Cellosolve, acetonitrile, lower alkanols, nitroesters and nitroethers.

Rubber-like materials can be prepared by interaction of our diisocyanates with anhydrous polyester cross-linking agents, such as polyesters prepared from glycols, such as ethylene glycol, 1,3-butylene glycol, 1,6-hexanediol, etc., and dibasic acids, such as succinic acid, diglycolic acid, phthalic acid, etc.

Our monomers form polymers with tetranitrodicarboxylic acids which can be prepared by interacting a tetranitro compound with methylacrylate and hydrolyzing the resulting tetranitro ester to form the acid.

Other polymers having desirable properties can be formed from aldehyde, amine, methylsulfonyl, and nitrile substituted monomers and cross-linking agents known to the art. In fact, the dialdehydes of our invention polymerize on standing or can be interacted with our polynitro dinitriles to form polynitro polyamides. The dialdehydes will also react with polyvinyl alcohol and polyvinyl amine to yield polynitro polymers.

The ketones of our invention can be reduced by sodium borohydride to form the corresponding tetranitro glycols which are monomers for polyester and polyamide polymers.

Our polymers can be mixed with various oxidant salts, such as ammonium nitrate, ammonium perchlorate, lithium perchlorate, etc. to obtain solid heterogeneous propellants having specific impulses on the order of that of ballistite.

The following examples are offered to illustrate the production of our new compounds and polymers which can be prepared from our new compounds. We do not intend to be limited to the specific materials, proportions, conditions, etc. shown, rather we intend to include all equivalents obvious to those skilled in the art.

Example 1

The compound 4,4,7,7-tetranitrodecanedioic acid was prepared by reacting 2.98 grams of 2,2,5,5-tetranitro-1,6-hexanediol with 2.88 grams of acrylic acid dissolved in 50 ml. of 90% aqueous methanol and enough aqueous sodium hydroxide to bring the pH to 6–7. The reactants were stirred at 50° C. for six hours after which the reaction mixture was slowly acidified with 5 N hydrochloric acid at 25° C. to precipitate the product which was recrystallized from water to give 2.27 grams of product.

*Example II*

The compound 4,4,8,8-tetranitroundecanedinitrile was prepared by reacting 2,2,6,6-tetranitro-1,7-heptanediol in the amount of 3.12 grams with 2.12 grams of acrylonitrile and 30 ml. of 90% aqueous methanol. A 10% sodium hydroxide solution was added in the amount of 0.7 ml. and the solution stirred at 50° for 24 hours after which the solution was cooled and the oil which had separated made to crystallize by scratching with a glass rod. The product was filtered, dried and recrystallized from 75% aqueous methanol. Melting point 91° C.

*Analysis.* — Calculated: N=23.43%. Found: N=23.42%.

*Example III*

The compound 5,5,8,8-tetranitrododecane-2,11-dione was prepared by reacting 1.19 grams of 1,1,4,4-tetranitrobutane with 0.9 gram of methylvinyl ketone in 15 ml. of 95% ethanol at a temperature of about 3° C. A 50% sodium hydroxide solution was then added in the amount of two drops and the solution stirred for one and one-half hours after which the mixture was allowed to warm to room temperature. The mixture was acidified with hydrogen chloride gas, diluted with water and filtered after which the precipitate, after washing with water and drying in a desiccator, weighed 1.59 grams. The product was recrystallized from 300 ml. of 95% ethanol to obtain 1.51 grams of material having a melting point of 152–153° C.

*Analysis.* — Calculated: N=14.81%. Found: N=15.09%.

*Example IV*

The compound 4,4,7,7-tetranitrodecanedial was prepared by reacting 1.2 grams of 1,1,4,4-tetranitrobutane with 0.6 gram of acrolein dissolved in 15 ml. of absolute ethanol at a temperature of 3° C. To the cold solution was added 0.4 ml. of a 1 molar sodium ethoxide solution and after stirring, the solution was allowed to warm to room temperature and stand for 1 hour. Acidification with ethanolic hydrogen chloride was followed by concentration in vacuo to obtain 2.0 grams of product as a pale yellow oil.

*Example V*

The compound 1,10-bis(methylsulfonyl)-3,3,8,8-tetranitrodecane was prepared by reacting 2.0 grams of 1,1,6,6-tetranitrohexane with 2.06 grams of methylvinyl sulfone and 30 ml. of 90% aqueous methanol. A 20% aqueous sodium hydroxide solution was added in the amount of 0.15 ml. and the solution stirred at 50° C. for 24 hours. After an additional 24 hours, the reaction mixture was made slightly acidic with dilute hydrochloric acid, cooled in an ice bath and filtered. Recrystallization from glacial acetic acid gave a white crystalline solid having a melting point of 169.5–170° C.

*Analysis.* — Calculated: N=11.71%. Found: N=11.45%.

*Example VI*

The compound 4,4,8,8-tetranitroundecanedioyl azide was prepared by reacting 4,4,8,8-tetranitroundecanedioyl chloride in the amount of 1.39 grams in 10 ml. of glacial acetic acid with 0.86 gram of sodium azide in 10 ml. of glacial acetic acid, the latter being added dropwise at 15° C. The mixture was stirred for 15 minutes and then diluted slowly with 60 ml. of water. The product was filtered, washed with water and dried. It gave a product melting at 72° C. with decomposition.

*Example VII*

The compound 3,3,7,7-tetranitrononamethylene diisocyanate was prepared by decomposing 0.1 gram of 4,4,8,8-tetranitroundecanedioyl azide in 3 ml. of dry chloroform at 50–55° C. After four hours the solution was refluxed for one-half hour. It was then filtered and upon cooling an oil separated. The solvent was removed under vacuum and an oil remained. It could not be made to crystallize.

*Example VIII*

The compound methyl 3,3,7,7-tetranitrononanedicarbamate was prepared by decomposing 1.35 grams of 4,4,8,8-tetranitroundecanedioyl azide in 13.5 ml. of dry chloroform at 50–55° C. for three hours. The solution was refluxed for an additional hour and 1 ml. of methanol was added. After again refluxing for one hour the solvents were removed under vacuum. The carbamate remained as a sticky, gummy semi-solid which crystallized. After two recrystallizations from an aqueous ethanol solution a product was obtained having a melting point of 93–94° C.

*Analysis.* — Calculated: N=18.50%. Found: N=18.62%.

*Example IX*

The compound 3,3,7,7-tetranitrononanediammonium chloride was prepared by refluxing 1.49 grams of crude methyl 3,3,7,7-tetranitrononanedicarbamate with 20 ml. of concentrated hydrochloric acid for 6 hours. The resulting solution was concentrated to a volume of 5 ml. and on cooling the amine hydrochloride was filtered and dried and gave a product melting at 216° C. with decomposition. Recrystallization from 18% hydrochloric acid gave a product having a melting point of 223° C. with decomposition.

*Analysis.* — Calculated: N=20.44%. Found: N=18.9%.

*Example X*

The compound 3,3,7,7-tetranitro-1,9-nonanediamine was prepared by adding one and one-half ml. of a 0.1 N sodium hydroxide solution to 30 mg. of 3,3,7,7-tetranitro-1,9-nonanediammonium chloride dissolved in water. One and one-half milliliters of a 0.1 N sodium hydroxide solution was added. White crystals slowly began to form. They were filtered after one hour and dried under vacuum. A melting point determination gave 91.5°–92° C.

*Example XI*

The compound dimethyl 4,4,7,7-tetranitrodecanedioate was prepared by reacting 2,2,5,5-tetranitro-1,6-hexanediol in the amount of 2.98 grams with 3.44 grams of methyl acrylate in the presence of 30 ml. of 90% aqueous methanol and 0.1 ml. of a 50% sodium hydroxide solution, the reaction mixture being stirred at 50° C. for six hours. The reaction mixture was then cooled to 25° C. and filtered, the residue being washed with methanol and recrystallized from benzene to give 2.77 grams of product melting at 157–157.5° C.

*Analysis.*—Calculated: N=13.66%. Found: N=13.82%.

*Example XII*

A two-gram portion of 4,4,7,7-tetranitrodecanedioic acid was reacted with 80 ml. of thionyl chloride, the reaction mixture being refluxed for three hours after which it was cooled to precipitate 4,4,7,7-tetranitrodecanedioyl chloride. A 0.42 gram portion of 4,4,7,7-tetranitrodecanedioyl dichloride and 0.065 gram of ethylene glycol were added to 2 ml. of dry dioxane. The solution was heated at 50° C. for 12 hours, a stream of dry nitrogen being passed through the solution after which the solution was poured into water and the resulting mixture vacuum steam distilled at 25° C. to obtain the desired polymer as a tan semi-solid.

As indicated above, our new compounds can be polymerized to obtain polymers useful as rocket propellants. The following examples are offered to illustrate the production of the polymers.

Example XIII

A 1.72 gram portion of 4,4,7,7-tetranitro-1,10-decanedinitrile was added to a solution of 0.15 gram of trioxane and 1 ml. of concentrated sulfuric acid in 5 ml. of 90% formic acid at a temperature of 50° C. The resulting solution was maintained at this temperature for 35 minutes and then at 26° C. for 40 minutes after which it was poured into 50 ml. of water at 5° C. with rapid stirring to precipitate a white solid polymer which softened in the range of 105–130° C.

Example XIV

A two-gram portion of 4,4,7,7-tetranitrodecanedial in the form of a pale yellow oil was mixed with a small amount of water and allowed to stand whereupon polymerization took place and a brittle, solid polymer was obtained which melted at 58–65° C.

This aplication is a continuation-in-part of our U.S. patent application Serial No. 669,911, filed June 28, 1957 now abandoned.

Now having described our invention what we claim is:

1. As a new composition of matter, compounds having the structural formula:

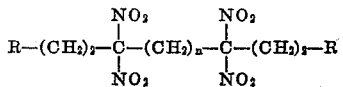

where R is selected from the group consisting of —CON$_3$,

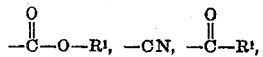

—SO$_2$CH$_3$, —NH$_2$, and —NCO; R$^1$ is selected from the group consisting of hydrogen, methyl, ethyl, propyl and butyl; and $n$ is a number from 0 to 10 inclusive.

2. 4,4,7,7-tetranitrooctanedinitrile.
3. 5,5,8,8-tetranitrodecane-2,11-dione.
4. 4,4,7,7-tetranitrodecane-1,10-dial.
5. 1,10 - bis(methylsulfonyl) - 3,3,8,8 - tetranitrodecane.
6. Dimethyl 4,4,7,7-tetranitrodecanedioate.
7. Dipropyl 4,4,8,8-tetranitroundecanedioate.
8. 4,4,7,7-tetranitrodecanedioic acid.
9. 4,4,8,8-tetranitroundecanedioic acid.
10. 4,4,9,9-tetranitrododecanedioic acid.
11. 4,4,8,8-tetranitroundecanedioylazide.

References Cited in the file of this patent

Klager: "Journ. of Org. Chem.," 20, #5, 646–55, May 1955.